US012120439B2

United States Patent
Sohn

(10) Patent No.: US 12,120,439 B2
(45) Date of Patent: Oct. 15, 2024

(54) IMAGE SENSOR

(71) Applicant: SK hynix Inc., Gyeonggi-do (KR)

(72) Inventor: Kwang June Sohn, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 182 days.

(21) Appl. No.: 17/972,788

(22) Filed: Oct. 25, 2022

(65) Prior Publication Data

US 2023/0336882 A1 Oct. 19, 2023

(30) Foreign Application Priority Data

Apr. 19, 2022 (KR) .................. 10-2022-0048169

(51) Int. Cl.
*H04N 25/46* (2023.01)
*H04N 25/11* (2023.01)
*H04N 25/59* (2023.01)
*H04N 25/75* (2023.01)

(52) U.S. Cl.
CPC ............ *H04N 25/46* (2023.01); *H04N 25/11* (2023.01); *H04N 25/59* (2023.01); *H04N 25/75* (2023.01)

(58) Field of Classification Search
CPC ........ H04N 25/11; H04N 25/46; H04N 25/59; H04N 25/75; H04N 25/77; H04N 25/778; H01L 27/14603; H01L 27/14621; H01L 27/14636
See application file for complete search history.

(56) References Cited

U.S. PATENT DOCUMENTS

| 7,728,896 B2 | 6/2010 | McKee | |
|---|---|---|---|
| 2012/0312964 A1* | 12/2012 | Yamashita | H04N 25/778 250/208.1 |
| 2013/0248939 A1* | 9/2013 | Sakai | H04N 25/767 257/231 |
| 2021/0006761 A1 | 1/2021 | Choi et al. | |
| 2021/0151485 A1* | 5/2021 | Ma | H01L 27/14831 |
| 2022/0124266 A1* | 4/2022 | Shin | H04N 25/77 |
| 2022/0328548 A1* | 10/2022 | Lee | H01L 27/14621 |

* cited by examiner

*Primary Examiner* — Lin Ye
*Assistant Examiner* — Chriss S Yoder, III
(74) *Attorney, Agent, or Firm* — IP & T GROUP LLP

(57) ABSTRACT

Disclosed is an image sensor including a pixel array including a plurality of unit pixel circuits arranged in a grid structure, and a plurality of switch circuits suitable for selectively coupling floating diffusion nodes included in the respective unit pixel circuits arranged in a vertical direction among the plurality of unit pixel circuits, wherein an arrangement pattern of pixels included in each of the plurality of unit pixel circuits is different from an arrangement pattern of color filters of the pixel array.

19 Claims, 4 Drawing Sheets

IMAGE SENSOR

CROSS-REFERENCE TO RELATED APPLICATION(S)

This application claims priority under 35 U.S.C. § 119 to Korean Patent Application No. 10-2022-0048169, filed on Apr. 19, 2022, the disclosure of which is incorporated herein by reference in its entirety.

BACKGROUND

1. Field

Various embodiments of the present disclosure relate to a semiconductor design technique, and more particularly, to an image sensor that supports a binning mode.

2. Description of the Related Art

Image sensors are devices for capturing images using the property of a semiconductor which reacts to light. Image sensors may be roughly classified into charge-coupled device (CCD) image sensors and complementary metal-oxide semiconductor (CMOS) image sensors. Recently, CMOS image sensors are widely used because the CMOS image sensors can allow both analog and digital control circuits to be directly implemented on a single integrated circuit (IC).

SUMMARY

Various embodiments of the present disclosure are directed to an image sensor that may support a binning mode even though an arrangement pattern of pixels included in a pixel group is different from an arrangement pattern of color filters of a pixel array.

In accordance with an embodiment of the present disclosure, an image sensor may include: a pixel array including a plurality of unit pixel circuits arranged in a grid structure; and a plurality of switch circuits suitable for selectively coupling floating diffusion nodes included in the respective unit pixel circuits arranged in a vertical direction among the plurality of unit pixel circuits, wherein an arrangement pattern of pixels included in each of the plurality of unit pixel circuits is different from an arrangement pattern of color filters of the pixel array.

In accordance with an embodiment of the present disclosure, an image sensor may include: a first unit pixel circuit disposed in at least one first column and including even-numbered first photodiodes; a second unit pixel circuit disposed in the at least one first column and including even-numbered second photodiodes; a third unit pixel circuit disposed in the at least one first column and including even-numbered third photodiodes; a first line coupled to a first floating diffusion node included in the first unit pixel circuit; second and third lines coupled to a second floating diffusion node included in the second unit pixel circuit; a fourth line coupled to a third floating diffusion node included in the third unit pixel circuit; a first switch suitable for selectively coupling the first line and the second line; and a second switch suitable for selectively coupling the third line and the fourth line, wherein the first to third unit pixel circuits sequentially read out respective first pixel signals from odd-numbered photodiodes among the first to third photodiodes through a first readout line when the first and second switches are simultaneously shorted according to a binning mode.

In accordance with an embodiment of the present disclosure, an image sensor may include: a first unit pixel circuit disposed in at least one first column and including even-numbered first photodiodes; a second unit pixel circuit disposed in the at least one first column and including even-numbered second photodiodes; a third unit pixel circuit disposed in the at least one first column and including even-numbered third photodiodes; a first line coupled to a first floating diffusion node included in the first unit pixel circuit; second and third lines coupled to a second floating diffusion node included in the second unit pixel circuit; a fourth line coupled to a third floating diffusion node included in the third unit pixel circuit; a first switch suitable for selectively coupling the first line and the second line; and a second switch suitable for selectively coupling the third line and the fourth line, wherein the first and second unit pixel circuits sequentially read out respective first pixel signals from odd-numbered photodiodes among the first and second photodiodes through a first readout line when the first switch is shorted and the second switch is opened or shorted according to a binning mode, and wherein the second and third unit pixel circuits sequentially read out respective second pixel signals from odd-numbered photodiodes among the second and third photodiodes through the first readout line when the first switch is opened or shorted and the second switch is shorted according to the binning mode.

In accordance with an embodiment of the present disclosure, an image sensor may include: first and second arrays each of at least 6×6 pixels that are grouped into at least first to fourth color filter groups of 2×2 arrangement; and a control circuit, wherein a whole of the first and second arrays are grouped into at least first to third groups each of 2×4 pixels and including respective first to third floating nodes, wherein the first and second arrays and the first to third groups are arranged in a direction, and wherein the control circuit is configured to readout: a first pixel signal from the first and second groups by coupling the first and second floating nodes, and then a second pixel signal from the second and third groups by coupling the second and third floating nodes, and a third pixel signal from the first to third groups by coupling the first to third floating nodes.

DETAILED DESCRIPTION

Various embodiments of the present disclosure are described below with reference to the accompanying drawings, in order to describe in detail the present disclosure so that those with ordinary skill in art to which the present disclosure pertains may easily carry out the technical spirit of the present disclosure.

It will be understood that when an element is referred to as being "connected to" or "coupled to" another element, the element may be directly connected to or coupled to the another element, or electrically connected to or coupled to the another element with one or more elements interposed therebetween. In addition, it will also be understood that the terms "comprises," "comprising," "includes," and "including" when used in this specification do not preclude the presence of one or more other elements, but may further include or have the one or more other elements, unless otherwise mentioned. In the description throughout the specification, some components are described in singular forms, but the present disclosure is not limited thereto, and it will be understood that the components may be formed in plural.

Figure 1:
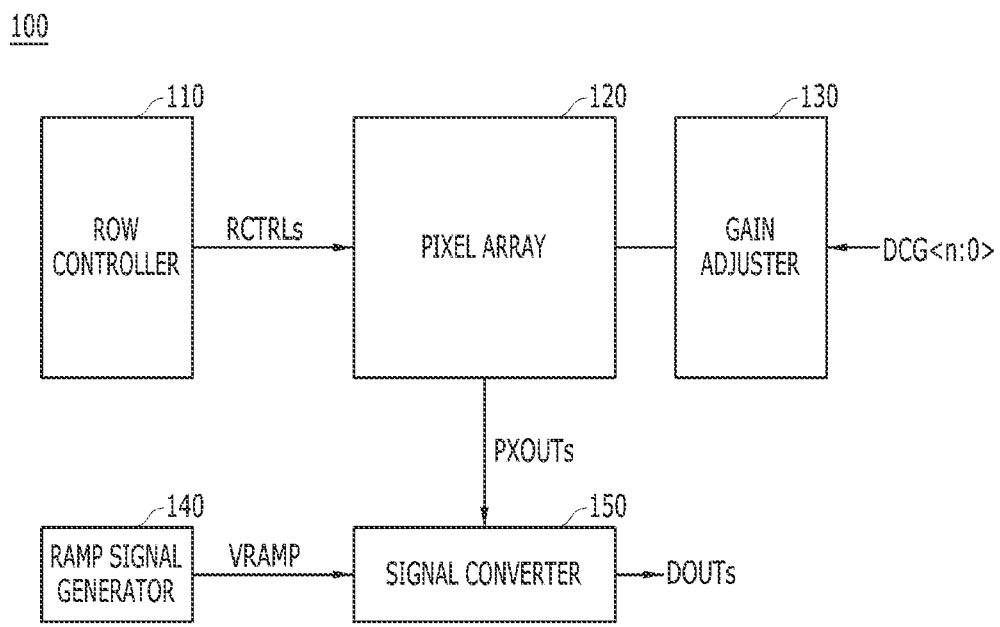
FIG. 1 is a block diagram illustrating an image sensor in accordance with an embodiment of the present disclosure.

FIG. 1 is a block diagram illustrating an image sensor 100 in accordance with an embodiment of the present disclosure.

Referring to FIG. 1, the image sensor 100 may include a row controller 110, a pixel array 120, a gain adjuster 130, a ramp signal generator 140 and a signal converter 150.

The row controller 110 may generate row control signals RCTRLs for controlling the pixel array 120. For example, the row controller 110 may generate first row control signals for controlling pixels arranged in a first row group, that is, first to fourth rows, of the pixel array 120, and generate $y^{th}$ row control signals for controlling pixels arranged in an $y^{th}$ row group, that is, 4*y−3 to 4*y rows, of the pixel array 120, where "y" is a natural number greater than 2. The row control signals RCTRLs may include the first to $y^{th}$ row control signals.

The pixel array 120 may include a plurality of pixels arranged at intersections of a plurality of rows and a plurality of columns. The plurality of pixels may output a plurality of pixel signals PXOUTs, which correspond to at least one row, on the basis of the row control signals RCTRLs. The pixel array 120 may include a plurality of unit pixel circuits, for example, PC0 to PC8, arranged in a grid structure (refer to FIG. 2).

The gain adjuster 130 may be coupled to the pixel array 120. The gain adjuster 130 may adjust conversion gains of the plurality of pixels on the basis of a plurality of control signals DCG<n:0>, The plurality of control signals DCG<n:0> may be selectively activated in a binning mode, and be deactivated in a normal mode. In the binning mode, the plurality of pixels may be grouped into pixels having the same color filter, and one pixel signal summed or averaged for each grouped pixel may be read out. In the normal mode, a plurality of pixel signals may be read out from the plurality of pixels, respectively.

The ramp signal generator 140 may generate a ramp signal VRAMP. The ramp signal VRAMP may ramp in a predetermined pattern, and be repeatedly generated.

The signal converter 150 may generate a plurality of code signals DOUTs on the basis of the ramp signal VRAMP and the plurality of pixel signals PXOUTs.

Figure 2:
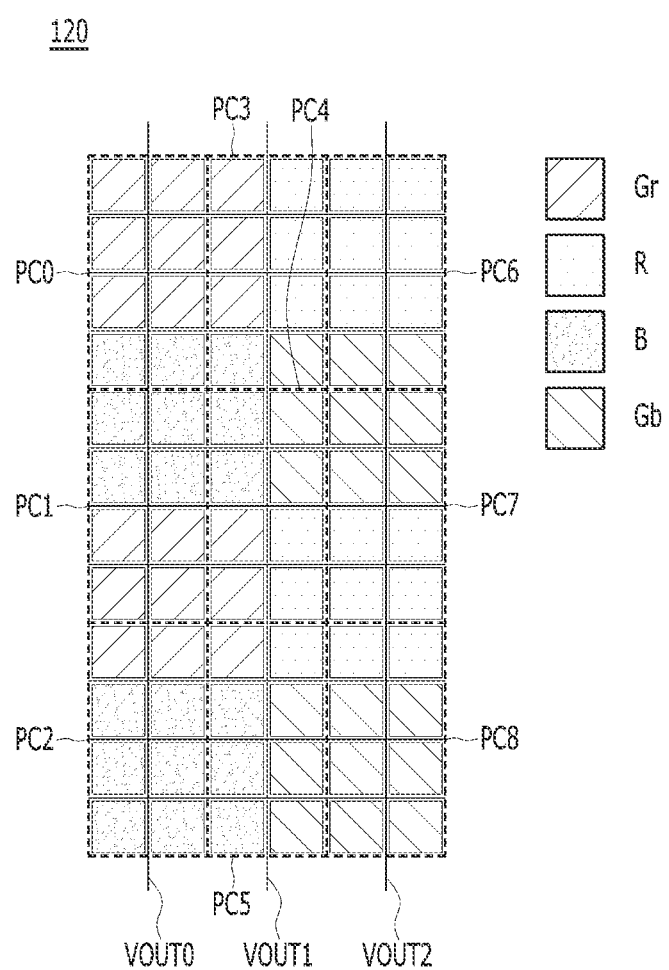
FIG. 2 is a diagram illustrating an example of a pixel array illustrated in FIG. 1 in accordance with an embodiment of the present disclosure.

FIG. 2 is a diagram illustrating an example of the pixel array 120 illustrated in FIG. 1 in accordance with an embodiment of the present disclosure.

Referring to FIG. 2, the pixel array 120 may have color filters in units of nona. The color filters in units of nona are based on a Bayer pattern. For example, the pixel array 120 may include a first array disposed on the top left, a second array disposed on the top right, a third array disposed on the bottom right, and a fourth array disposed on the bottom left.

The first to fourth arrays may be repeatedly disposed. The first array may include first 3×3 pixels, and the first pixels may have green filters Gr. The second array may include second 3×3 pixels, and the second pixels may have red filters R. The third array may include third 3×3 pixels, and the third pixels may have green filters Gb. The fourth array may include fourth 3×3 pixels, and the fourth pixels may have blue filters B. The green filters Gr, the red filters R, the green filters Gb and the blue filters B may be arranged in various ways according to the Bayer pattern.

In the present embodiment, it is described as an example that the pixel array 120 has 3×3 color filters. However, the present disclosure is not necessarily limited thereto, and the pixel array 120 may have various arrangements of color filters, for example, 5×5, etc.

The pixel array 120 may include first to ninth unit pixel circuits PC0 to PC8. The first to third unit pixel circuits PC0 to PC2 may be arranged side by side in a vertical direction, the fourth to sixth unit pixel circuits PC3 to PC5 may be arranged side by side in the vertical direction, and the seventh to ninth unit pixel circuits PC6 to PC8 may be arranged side by side in the vertical direction. The first unit pixel circuit PC0, the fourth unit pixel circuit PC3 and the seventh unit pixel circuit PC6 may be arranged side by side in a horizontal direction, the second unit pixel circuit PC1, the fifth unit pixel circuit PC4 and the eighth unit pixel circuit PC7 may be arranged side by side in the horizontal direction, and the third unit pixel circuit PC2, the sixth unit pixel circuit PC5 and the ninth unit pixel circuit PC8 may be arranged side by side in the horizontal direction.

The first to third unit pixel circuits PC0 to PC2 may be arranged in a first column group, that is, first and second columns. The first unit pixel circuit PC0 may be disposed on one side of the first column group in the vertical direction. The first unit pixel circuit PC0 may include 2×4 pixels. The first unit pixel circuit PC0 may include 2×3 pixels having the green filters Gr and 2×1 pixels having the blue filters B. The second unit pixel circuit PC1 may be disposed between the first unit pixel circuit PC0 and the third unit pixel circuit PC2 in the first column group. The second unit pixel circuit PC1 may include 2×4 pixels. The second unit pixel circuit PC1 may include 2×2 pixels having the blue filters B and 2×2 pixels having the green filters Gr. The third unit pixel circuit PC2 may be disposed on the other side of the first column group in the vertical direction. The third unit pixel circuit PC2 may include 2×4 pixels. The third unit pixel circuit PC2 may include 2×1 pixels having the green filters Gr and 2×3 pixels having the blue filters B. The first to third unit pixel circuits PC0 to PC2 may sequentially output pixel signals through a first readout line VOUT0.

The fourth to sixth unit pixel circuits PC3 to PC5 may be arranged in a second column group, that is, third and fourth columns. The fourth unit pixel circuit PC3 may be disposed on one side of the second column group in the vertical direction. The fourth unit pixel circuit PC3 may include 2×4 pixels. The fourth unit pixel circuit PC3 may include 1×3 pixels having the green filters Gr, 1×3 pixels having the red filters R, 1×1 pixel having the green filter Gb, and 1×1 pixel having the blue filter B. The fifth unit pixel circuit PC4 may be disposed between the fourth unit pixel circuit PC3 and the sixth unit pixel circuit PC5 in the second column group. The fifth unit pixel circuit PC4 may include 2×4 pixels. The fifth unit pixel circuit PC4 may include 1×2 pixels having the blue filters B, 1×2 pixels having the green filters Gb, 1×2 pixels having the red filters R, and 1×2 pixels having the green filters Gr. The sixth unit pixel circuit PC5 may be disposed on the other side of the second column group in the vertical direction. The sixth unit pixel circuit PC5 may include 2×4 pixels. The sixth unit pixel circuit PC5 may include 1×1 pixel having the green filter Gr, 1×1 pixel having the red filter R, 1×3 pixels having the green filters Gb, and 1×3 pixels having the blue filters B. The fourth to sixth unit pixel circuits PC3 to PC5 may sequentially output pixel signals through a second readout line VOUT1.

The seventh to ninth unit pixel circuits PC6 to PC8 may be arranged in a third column group, that is, fifth and sixth columns. The seventh unit pixel circuit PC6 may be disposed on one side of the third column group in the vertical direction. The seventh unit pixel circuit PC6 may include 2×4 pixels. The seventh unit pixel circuit PC6 may include 2×3 pixels having the red filters R and 2×1 pixels having the green filters Gb. The eighth unit pixel circuit PC7 may be disposed between the seventh unit pixel circuit PC6 and the ninth unit pixel circuit PC8 in the third column group. The eighth unit pixel circuit PC7 may include 2×4 pixels. The eighth unit pixel circuit PC7 may include 2×2 pixels having the green filters Gb and 2×2 pixels having the red filters R. The ninth unit pixel circuit PC8 may be disposed on the other side of the third column group in the vertical direction. The ninth unit pixel circuit PC8 may include 2×4 pixels. The ninth unit pixel circuit PC8 may include 2×1 pixels having the red filters R and 2×3 pixels having the green filters Gb. The seventh to ninth unit pixel circuits PC6 to PC8 may sequentially output pixel signals through a third readout line VOUT2.

In the present embodiment, it is described as an example that each of the first to ninth unit pixel circuits PC0 to PC8 includes 2×4 pixels. However, the present disclosure is not necessarily limited thereto, and each of the first to ninth unit pixel circuits PC0 to PC8 may include various arrangements of pixels, for example, 1×4, 2×2, etc.

It may be seen that an arrangement pattern of the pixels included in each of the first to ninth unit pixel circuits PC0 to PC8 is different from an arrangement pattern of the color filters of the pixel array 120. An arrangement pattern of each of the first to ninth unit pixel circuits PC0 to PC8 may correspond to a first arrangement pattern of even-numbered color filters of even-numbered pixels, that is, 2×4=8 pixels. Unlike this, the arrangement pattern of the color filters of the pixel array 120 may correspond to a second arrangement pattern of odd-numbered color filters of odd-numbered pixels, that is, 3×3=9 pixels. For reference, each of the first to ninth unit pixel circuits PC0 to PC8 may have a structure in which the even-numbered pixels, that is, 2×4=8 pixels, share some circuits (refer to FIG. 3). For example, a layout of first to eighth photodiodes PD0 to PD7 included in the first unit pixel circuit PC0 may be designed in a symmetrical structure with respect to a first floating diffusion node FD0 included in the first unit pixel circuit PC0 so that physical distances or coupling lines between the first to eighth photodiodes PD0 to PD7 and the first floating diffusion node FD0 have the same load. As the physical distances or coupling lines between the first to eighth photodiodes PD0 to PD7 and the first floating diffusion node FD0 have the same load, a characteristic difference between the first to eighth photodiodes PD0 to PD7 may be minimized. Moreover, since the pixel array 120 has the odd-numbered color filters, that is, 3×3=9 color filters, the sensitivity in the binning mode may be improved.

Figure 3:
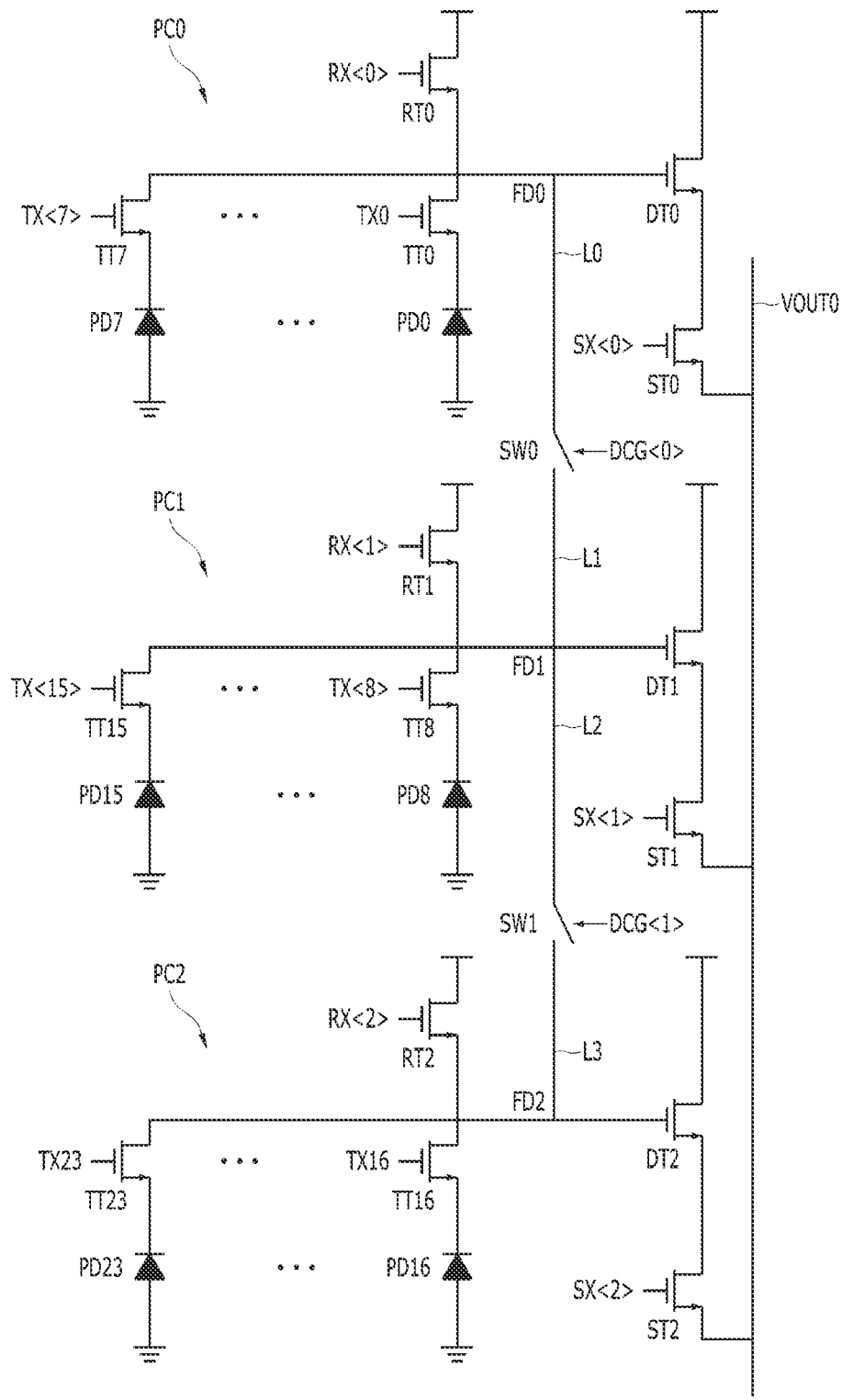
FIG. 3 is a circuit diagram illustrating an example of the pixel array and a gain adjuster illustrated in FIG. 1 in accordance with an embodiment of the present disclosure.

FIG. 3 is a circuit diagram illustrating an example of the pixel array 120 and the gain adjuster 130 illustrated in FIG. 1 in accordance with an embodiment of the present disclosure. It is noted that only a part of the pixel array 120, which corresponds to the first to third unit pixel circuits PC0 to PC2 illustrated in FIG. 2, and only a part of the gain adjuster 130 are representatively illustrated in FIG. 3.

Referring to FIG. 3, the first unit pixel circuit PC0 may include the first to eighth photodiodes PD0 to PD7, first to eighth transmission elements TT0 to TT7, a first reset element RT0, a first floating diffusion node FD0, a first driving element DT0 and a first selection element ST0. The first to eighth photodiodes PD0 to PD7 and the first to eighth transmission elements TT0 to TT7 may share the first reset element RT0, the first floating diffusion node FD0, the first driving element DT0 and the first selection element ST0.

The first to eighth photodiodes PD0 to PD7 may be coupled between a low-voltage supply terminal and the respective first to eighth transmission elements TT0 to TT7.

The first to eighth transmission elements TT0 to TT7 may be coupled between the respective first to eighth photodiodes PD0 to PD7 and the first floating diffusion node FD0. The first to eighth transmission elements TT0 to TT7 may selectively couple the respective first to eighth photodiodes PD0 to PD7 to the first floating diffusion node FD0 on the basis of first to eighth transmission control signals TX<0:7>, respectively.

The first reset element RT0 may be coupled between a high-voltage supply terminal and the first floating diffusion node FD0. The first reset element RT0 may selectively couple the high-voltage supply terminal to the first floating diffusion node FD0 on the basis of a first reset control signal RX<0>.

The first floating diffusion node FD0 may store charges transmitted from at least one of the first to eighth photodiodes PD0 to PD7. For example, a parasitic capacitor (not illustrated) capable of storing the charges may be coupled to the first floating diffusion node FD0. The first floating diffusion node FD0 may be coupled to one end of a first switch SW0 included in the gain adjuster 130.

The first driving element DT0 may be coupled among the first floating diffusion node FD0, the high-voltage supply terminal and the first selection element ST0. The first driving element DT0 may generate a first pixel signal with a high voltage on the basis of a voltage loaded on the first floating diffusion node FD0.

The first selection element ST0 may be coupled between the first driving element DT0 and the first readout line VOUT0. The first selection element ST0 may output the first pixel signal to the first readout line VOUT0 on the basis of a first selection control signal SX<0>.

The second unit pixel circuit PC1 may include ninth to $16^{th}$ photodiodes PD8 to PD15, ninth to $16^{th}$ transmission elements TT8 to TT15, a second reset element RT1, a second floating diffusion node FD1, a second driving element DT1 and a second selection element ST1. The ninth to $16^{th}$ photodiodes PD8 to PD15 and the ninth to 16th transmission elements TT8 to TT15 may share the second reset element RT1, the second floating diffusion node FD1, the second driving element DT1 and the second selection element ST1.

The ninth to $16^{th}$ photodiodes PD8 to PD15 may be coupled between the low-voltage supply terminal and the respective ninth to $16^{th}$ transmission elements TT8 to TT15.

The ninth to $16^{th}$ transmission elements TT8 to TT15 may be coupled between the respective ninth to $16^{th}$ photodiodes PD8 to PD15 and the second floating diffusion node FD1. The ninth to $16^{th}$ transmission elements TT8 to TT15 may selectively couple the respective ninth to $16^{th}$ photodiodes PD8 to PD15 to the second floating diffusion node FD1 on the basis of ninth to $16^{th}$ transmission control signals TX<8:15>, respectively.

The second reset element RT1 may be coupled between the high-voltage supply terminal and the second floating diffusion node FD1, The second reset element RT1 may selectively couple the high-voltage supply terminal to the second floating diffusion node FD1 on the basis of a second reset control signal RX<1>.

The second floating diffusion node FD1 may store charges transmitted from at least one of the ninth to $16^{th}$ photodiodes PD8 to PD15. For example, a parasitic capacitor (not illustrated) capable of storing the charges may be coupled to the second floating diffusion node FD1. The second floating diffusion node FD1 may be coupled to the other end of the first switch SW0 included in the gain adjuster 130 and one end of a second switch SW1 included in the gain adjuster 130.

The second driving element DT1 may be coupled among the second floating diffusion node FD1, the high-voltage supply terminal and the second selection element ST1. The second driving element DT1 may generate a second pixel signal with the high voltage on the basis of a voltage loaded on the second floating diffusion node FD1.

The second selection element ST1 may be coupled between the second driving element DT1 and the first readout line VOUT0. The second selection element ST1 may output the second pixel signal to the first readout line VOUT0 on the basis of a second selection control signal SX<1.

The third unit pixel circuit PC2 may include $17^{th}$ to $24^{th}$ photodiodes PD16 to PD23, $17^{th}$ to $24^{th}$ transmission elements TT16 to TT23, a third reset element RT2, a third floating diffusion node FD2, a third driving element DT2 and a third selection element ST2, The $17^{th}$ to $24^{th}$ photodiodes PD16 to PD23 and the $17^{th}$ to $24^{th}$ transmission elements TT16 to TT23 may share the third reset element RT2, the third floating diffusion node FD2, the third driving element DT2 and the third selection element ST2.

The $17^{th}$ to $24^{th}$ photodiodes PD16 to PD23 may be coupled between the low-voltage supply terminal and the respective $17^{th}$ to $24^{th}$ transmission elements TT16 to TT23.

The $17^{th}$ to $24^{th}$ transmission elements TT16 to TT23 may be coupled between the respective $17^{th}$ to $24^{th}$ photodiodes PD16 to PD23 and the third floating diffusion node FD2. The $17^{th}$ to $24^{th}$ transmission elements TT16 to TT23 may selectively couple the respective $17^{th}$ to $24^{th}$ photodiodes PD16 to PD23 to the third floating diffusion node FD2 on the basis of $17^{th}$ to $24^{th}$ transmission control signals TX<16:23>, respectively.

The third reset element RT2 may be coupled between the high-voltage supply terminal and the third floating diffusion node FD2, The third reset element RT2 may selectively couple the high-voltage supply terminal to the third floating diffusion node FD2 on the basis of a third reset control signal RX<2>.

The third floating diffusion node FD2 may store charges transmitted from at least one of the $17^{th}$ to $24^{th}$ photodiodes PD16 to PD23. For example, a parasitic capacitor (not illustrated) capable of storing the charges may be coupled to the third floating diffusion node FD2. The third floating diffusion node FD2 may be coupled to the other end of the second switch SW1 included in the gain adjuster 130.

The third driving element DT2 may be coupled among the third floating diffusion node FD2, the high-voltage supply terminal and the third selection element ST2. The third driving element DT2 may generate a third pixel signal with the high voltage on the basis of a voltage loaded on the third floating diffusion node FD2.

The third selection element ST2 may be coupled between the third driving element DT2 and the first readout line VOUT0. The third selection element ST2 may output the third pixel signal to the first readout line VOUT0 on the basis of a third selection control signal SX<2>.

The gain adjuster 130 may include first to fourth lines L0 to L3 and a first switch circuit SW0 and SW1.

The first line L0 may be coupled to the first floating diffusion node FD0, the second line L1 may be coupled to the second floating diffusion node FD1, the third line L2 may be coupled to the second floating diffusion node FD1, and the fourth line L3 may be coupled to the third floating diffusion node FD2.

The first switch circuit SW0 and SW1 may be coupled to the first to third unit pixel circuits PC0 to PC2. The first switch circuit SW0 and SW1 may include the first switch SW0 and the second switch SW1. The first switch SW0 may be coupled between the first line L0 coupled to the first floating diffusion node FD0 and the second line L1 coupled to the second floating diffusion node FD1. The first switch SW0 may be shorted or opened in the binning mode and be opened in the normal mode, on the basis of the first control signal DCG<0>. The second switch SW1 may be coupled between the third line L2 coupled to the second floating diffusion node FD1 and the fourth line L3 coupled to the third floating diffusion node FD2. The second switch SW1 may be shorted or opened in the binning mode and be opened in the normal mode, on the basis of the second control signal DCG<1>.

Figure 4:
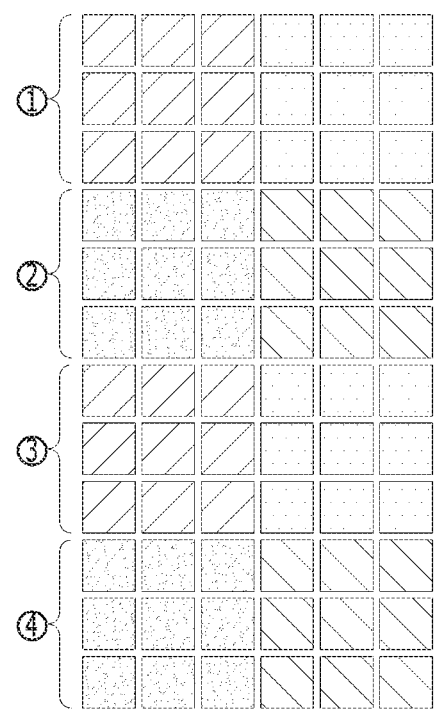
FIG. 4 is a diagram illustrating an operation of the image sensor illustrated in FIG. 1 in accordance with an embodiment of the present disclosure.

FIG. 4 is a diagram illustrating an operation of the image sensor 100 illustrated in FIG. 1 in accordance with an embodiment of the present disclosure. For example, FIG. 4 describes an operation of the image sensor 100 according to the binning mode.

First, the operation of the image sensor 100 in the binning mode is described according to an example.

Referring to FIG. 4, both of the first and second switches SW0 and SW1 may be shorted in response to activated first and second control signals DCG<1:0>. As the first and second switches SW0 and SW1 are shorted, the first to third floating diffusion nodes FD0 to FD2 may be coupled to one another. Accordingly, a fill factor may increase, and a multiple conversion gain may be implemented.

When the first and second switches SW0 and SW1 are simultaneously shorted, the first to third unit pixel circuits PC0 to PC2 may sequentially read out each of the first pixel signals, which correspond to odd-numbered photodiodes, that is, photodiodes corresponding to 1×3 pixels having the same color filter, from even-numbered photodiodes, that is, the first to $24^{th}$ photodiodes PD0 to PD23, through the first readout line VOUT0 (①→②→③→④). The first pixel signal may be a synthesized signal of pixel signals generated from the 1×3 pixels having the same color filter.

The fourth to sixth unit pixel circuits PC3 to PC5 may operate in the same manner as the first to third unit pixel circuits PC0 to PC2, and the seventh to ninth unit pixel circuits PC6 to PC8 may also operate in the same manner as the first to third unit pixel circuits PC0 to PC2.

Next, the operation of the image sensor 100 in the binning mode is described according to another example.

The first switch SW0 may be shorted in response to an activated first control signal DCG<0>, and the second switch SW1 may be opened in response to a deactivated second control signal DCG<1>, As the first switch SW0 is shorted, the first and second floating diffusion nodes FD0 and FD1 may be coupled to one another. Depending on the design, the second control signal DCG<1> may be activated, and the second switch SW1 may be shorted. Accordingly, a fill factor may increase, and a multiple conversion gain may be implemented.

When the first switch SW0 is shorted, the first and second unit pixel circuits PC0 and PC1 may sequentially read out each of the first pixel signals, which correspond to odd-numbered photodiodes, that is, photodiodes corresponding to 1×3 pixels having the same color filter, from even-numbered photodiodes, that is, the first to $16^{th}$ photodiodes PD0 to PD15, through the first readout line VOUT0 (①→②). The first pixel signal may be a synthesized signal of pixel signals generated from the 1×3 pixels having the same color filter.

Subsequently, the first switch SW0 may be opened in response to a deactivated first control signal DCG<0>, and the second switch SW1 may be shorted in response to an activated second control signal DCG<1>, As the second switch SW1 is shorted, the second and third floating diffusion nodes FD1 and FD2 may be coupled to one another. Depending on the design, the first control signal DCG<0> may be activated, and the first switch SW0 may be shorted. Accordingly, a fill factor may increase, and a multiple conversion gain may be implemented.

When the second switch SW1 is shorted, the second and third unit pixel circuits PC1 and PC2 may sequentially read out each of the second pixel signals, which correspond to odd-numbered photodiodes, that is, photodiodes corresponding to 1×3 pixels having the same color filter, from even-numbered photodiodes, that is, the ninth to $24^{th}$ photodiodes PD8 to PD23, through the first readout line VOUT0 (③→④). The second pixel signal may be a synthesized signal of pixel signals generated from the 1×3 pixels having the same color filter.

The fourth to sixth unit pixel circuits PC3 to PC5 may operate in the same manner as the first to third unit pixel circuits PC0 to PC2, and the seventh to ninth unit pixel circuits PC6 to PC8 may also operate in the same manner as the first to third unit pixel circuits PC0 to PC2.

According to an embodiment of the present disclosure, even though an arrangement pattern of pixels included in a unit pixel circuit is different from an arrangement pattern of color filters of a pixel array, an image sensor may support a binning mode.

According to an embodiment of the present disclosure, performance of an image sensor may be improved since the image sensor may support a binning mode even though an arrangement pattern of pixels included in a unit pixel circuit is different from an arrangement pattern of color filters of a pixel array.

While the present disclosure has been illustrated and described with respect to specific embodiment, the disclosed embodiment is provided for the description, and not intended to be restrictive. Further, it is noted that the present disclosure may be achieved in various ways through substitution, change, and modification that fall within the scope of the following claims, as those skilled in the art will recognize in light of the present disclosure. Furthermore, the embodiments may be combined to form additional embodiments.

What is claimed is:

1. An image sensor comprising:
   a pixel array including a plurality of unit pixel circuits arranged in a grid structure; and
   a plurality of switch circuits suitable for selectively coupling floating diffusion nodes included in the respective unit pixel circuits arranged in a vertical direction among the plurality of unit pixel circuits,
   wherein an arrangement pattern of pixels included in each of the plurality of unit pixel circuits is different from an arrangement pattern of color filters of the pixel array.

2. The image sensor of claim 1, wherein
   the arrangement pattern of the pixels corresponds to a first arrangement pattern of even-numbered color filters of even-numbered pixels, and
   the arrangement pattern of color filters of the pixel array corresponds to a second arrangement pattern of odd-numbered color filters of odd-numbered pixels.

3. The image sensor of claim 1, further comprising a readout line extending in the vertical direction and coupled to the respective unit pixel circuits.

4. The image sensor of claim 1, wherein photodiodes of the pixels share corresponding one of the floating diffusion nodes.

5. The Image sensor of claim 1, wherein each of the plurality of switch circuits electrically couples some or all of the floating diffusion nodes in a binning mode, and electrically isolates each of the floating diffusion nodes in a normal mode.

6. An image sensor comprising:
   a first unit pixel circuit disposed in at least one first column and including even-numbered first photodiodes;
   a second unit pixel circuit disposed in the at least one first column and including even-numbered second photodiodes;
   a third unit pixel circuit disposed in the at least one first column and including even-numbered third photodiodes;
   a first line coupled to a first floating diffusion node included in the first unit pixel circuit;
   second and third lines coupled to a second floating diffusion node included in the second unit pixel circuit;
   a fourth line coupled to a third floating diffusion node included in the third unit pixel circuit;
   a first switch suitable for selectively coupling the first line and the second line; and
   a second switch suitable for selectively coupling the third line and the fourth line,
   wherein the first to third unit pixel circuits sequentially read out respective first pixel signals from odd-numbered photodiodes among the first to third photodiodes through a first readout line when the first and second switches are simultaneously shorted according to a binning mode.

7. The image sensor of claim 6, wherein
   the first photodiodes share the first floating diffusion node,
   the second photodiodes share the second floating diffusion node, and
   the third photodiodes share the third floating diffusion node.

8. The image sensor of claim 6, further comprising:
   a fourth unit pixel circuit disposed in at least one second column, and including even-numbered fourth photodiodes;
   a fifth unit pixel circuit disposed in the at least one second column, and including even-numbered fifth photodiodes;
   a sixth unit pixel circuit disposed in the at least one second column, and including even-numbered sixth photodiodes;
   a fifth line coupled to a fourth floating diffusion node included in the fourth unit pixel circuit;
   sixth and seventh lines coupled to a fifth floating diffusion node included in the fifth unit pixel circuit;

an eighth line coupled to a sixth floating diffusion node included in the sixth unit pixel circuit;
a third switch suitable for selectively coupling the fifth line and the sixth line; and
a fourth switch suitable for selectively coupling the seventh line and the eighth line,
wherein the fourth to sixth unit pixel circuits sequentially read out respective second pixel signals from odd-numbered photodiodes among the fourth to sixth photodiodes through a second readout line when the third and fourth switches are simultaneously shorted according to the binning mode.

9. The image sensor of claim 8, wherein
the fourth photodiodes share the fourth floating diffusion node,
the fifth photodiodes share the fifth floating diffusion node, and
the sixth photodiodes share the sixth floating diffusion node.

10. The image sensor of claim 8, further comprising:
a seventh unit pixel circuit disposed in at least one third column, and including even-numbered seventh photodiodes;
an eighth unit pixel circuit disposed in the at least one third column, and including even-numbered eighth photodiodes;
a ninth unit pixel circuit disposed in the at least one third column, and including even-numbered ninth photodiodes;
a ninth line coupled to a seventh floating diffusion node included in the seventh unit pixel circuit;
tenth and eleventh lines coupled to an eighth floating diffusion node included in the eighth unit pixel circuit;
a twelfth line coupled to a ninth floating diffusion node included in the ninth unit pixel circuit;
a fifth switch suitable for selectively coupling the ninth line and the tenth line; and
a sixth switch suitable for selectively coupling the eleventh line and the twelfth line,
wherein the seventh to ninth unit pixel circuits sequentially read out respective third pixel signals from odd-numbered photodiodes among the seventh to ninth photodiodes through a third readout line when the fifth and sixth switches are simultaneously shorted according to the binning mode.

11. The image sensor of claim 10, wherein
the seventh photodiodes share the seventh floating diffusion node,
the eighth photodiodes share the eighth floating diffusion node, and
the ninth photodiodes share the ninth floating diffusion node.

12. The image sensor of claim 10, wherein the first to sixth switches are opened in a normal mode.

13. An image sensor comprising:
a first unit pixel circuit disposed in at least one first column and including even-numbered first photodiodes;
a second unit pixel circuit disposed in the at least one first column and including even-numbered second photodiodes;
a third unit pixel circuit disposed in the at least one first column and including even-numbered third photodiodes;
a first line coupled to a first floating diffusion node included in the first unit pixel circuit;
second and third lines coupled to a second floating diffusion node included in the second unit pixel circuit;
a fourth line coupled to a third floating diffusion node included in the third unit pixel circuit;
a first switch suitable for selectively coupling the first line and the second line; and
a second switch suitable for selectively coupling the third line and the fourth line,
wherein the first and second unit pixel circuits sequentially read out respective first pixel signals from odd-numbered photodiodes among the first and second photodiodes through a first readout line when the first switch is shorted and the second switch is opened or shorted according to a binning mode, and
wherein the second and third unit pixel circuits sequentially read out respective second pixel signals from odd-numbered photodiodes among the second and third photodiodes through the first readout line when the first switch is opened or shorted and the second switch is shorted according to the binning mode.

14. The image sensor of claim 13, wherein
the first photodiodes share the first floating diffusion node,
the second photodiodes share the second floating diffusion node, and
the third photodiodes share the third floating diffusion node.

15. The image sensor of claim 13, further comprising:
a fourth unit pixel circuit disposed in at least one second column and including even-numbered fourth photodiodes;
a fifth unit pixel circuit disposed in the at least one second column and including even-numbered fifth photodiodes;
a sixth unit pixel circuit disposed in the at least one second column and including even-numbered sixth photodiodes;
a fifth line coupled to a fourth floating diffusion node included in the fourth unit pixel circuit;
sixth and seventh lines coupled to a fifth floating diffusion node included in the fifth unit pixel circuit;
an eighth line coupled to a sixth floating diffusion node included in the sixth unit pixel circuit;
a third switch suitable for selectively coupling the fifth line and the sixth line; and
a fourth switch suitable for selectively coupling the seventh line and the eighth line,
wherein the fourth and fifth unit pixel circuits sequentially read out respective third pixel signals from odd-numbered photodiodes among the fourth and fifth photodiodes through a second readout line when the third switch is shorted and the fourth switch is opened or shorted according to the binning mode, and
wherein the fifth and sixth unit pixel circuits sequentially read out respective fourth pixel signals from odd-numbered photodiodes among the fifth and sixth photodiodes through the second readout line when the third switch is opened or shorted and the fourth switch is shorted according to the binning mode.

16. The image sensor of claim 15, wherein
the fourth photodiodes share the fourth floating diffusion node,
the fifth photodiodes share the fifth floating diffusion node, and
the sixth photodiodes share the sixth floating diffusion node.

17. The image sensor of claim 15, further comprising:
a seventh unit pixel circuit disposed in at least one third column and including even-numbered seventh photodiodes;
an eighth unit pixel circuit disposed in the at least one third column and including even-numbered eighth photodiodes;
a ninth unit pixel circuit disposed in the at least one third column and including even-numbered ninth photodiodes;
a ninth line coupled to a seventh floating diffusion node included in the seventh unit pixel circuit;
tenth and eleventh lines coupled to an eighth floating diffusion node included in the eighth unit pixel circuit;
a twelfth line coupled to a ninth floating diffusion node included in the ninth unit pixel circuit;
a fifth switch suitable for selectively coupling the ninth line and the $10^{th}$ line; and
a sixth switch suitable for selectively coupling the eleventh line and the twelfth line,
wherein the seventh and eighth unit pixel circuits sequentially read out respective fifth pixel signals from odd-numbered photodiodes among the seventh and eighth photodiodes through a third readout line when the fifth switch is shorted and the sixth switch is opened or shorted according to the binning mode, and
wherein the eighth and ninth unit pixel circuits sequentially read out respective sixth pixel signals from odd-numbered photodiodes among the eighth and ninth photodiodes through the third readout line when the fifth switch is opened or shorted and the sixth switch is shorted according to the binning mode.

18. The image sensor of claim 17, wherein
the seventh photodiodes share the seventh floating diffusion node,
the eighth photodiodes share the eighth floating diffusion node, and
the ninth photodiodes share the ninth floating diffusion node.

19. The image sensor of claim 17, wherein the first to sixth switches are opened in a normal mode.

* * * * *